(12) United States Patent
Magri

(10) Patent No.: US 9,073,709 B2
(45) Date of Patent: Jul. 7, 2015

(54) PALLETISING DEVICE

(75) Inventor: Giacomo Magri, Beduzzo (IT)

(73) Assignee: A.C.M.I.—SOCIETA' PER AZIONI, Fornovo di Taro (Parma) (IT)

( * ) Notice: Subject to any disclaimer, the term of this patent is extended or adjusted under 35 U.S.C. 154(b) by 300 days.

(21) Appl. No.: 13/146,390

(22) PCT Filed: Jan. 26, 2010

(86) PCT No.: PCT/EP2010/050830
§ 371 (c)(1),
(2), (4) Date: Jul. 26, 2011

(87) PCT Pub. No.: WO2010/086292
PCT Pub. Date: Aug. 5, 2010

(65) Prior Publication Data
US 2011/0277423 A1    Nov. 17, 2011

(30) Foreign Application Priority Data

Jan. 27, 2009    (IT) .............. RE2009A0004

(51) Int. Cl.
| | |
|---|---|
| B65G 1/18 | (2006.01) |
| B65G 57/06 | (2006.01) |
| B65G 57/03 | (2006.01) |
| B65G 57/24 | (2006.01) |

(52) U.S. Cl.
CPC .............. B65G 57/06 (2013.01); B65G 57/035 (2013.01); B65G 57/24 (2013.01); B65G 57/245 (2013.01)

(58) Field of Classification Search
CPC ...... B65G 57/22; B65G 57/245; B65G 57/24; B65G 57/02; B65G 57/035; B65G 57/06; B65G 5/06; B65G 61/00

USPC ............. 414/799, 792.7, 792.8, 793.1, 793.3, 414/793.4, 793.5, 793.9, 794, 794.2, 791.4, 414/791.6; 294/119.1; 271/190, 191; 53/147, 443

See application file for complete search history.

(56) References Cited

U.S. PATENT DOCUMENTS 3,471,038 A * 10/1969 Verrinder ................... 414/793.5
3,529,732 A * 9/1970 Wayne ....................... 414/793.5
(Continued)

FOREIGN PATENT DOCUMENTS

DE          2808129 A1      8/1979
DE     202005015887 U1      5/2006
(Continued)

OTHER PUBLICATIONS

FR2861714 Machine English Translation; Gilles; May 2005.*

Primary Examiner — Saul Rodriguez
Assistant Examiner — Lynn Schwenning
(74) Attorney, Agent, or Firm — Volpe and Koenig, P.C.

(57) ABSTRACT

A palletizing device including a lower surface which restingly receives a pallet, and an upper platform which is provided with a variably-configurable first support, cyclically between a closed configuration in which the first support supports a layer of products and an open configuration in which the layer of products is released downwardly; an intermediate platform between the lower surface and the upper platform, which move between a raised position and a lowered position and vice versa, comprising a variably-configurable second support which, maintain the second support in a closed configuration, thus forming a stack, and which release the stack of products towards the underlying lower surface in an open configuration.

16 Claims, 9 Drawing Sheets

(56) References Cited

U.S. PATENT DOCUMENTS

| | | | | |
|---|---|---|---|---|
| 4,024,965 A | * | 5/1977 | Marth et al. | 414/789.1 |
| 4,055,257 A | * | 10/1977 | Krebs | 414/793.5 |
| 4,205,934 A | * | 6/1980 | Pantin et al. | 414/793.5 |
| 4,255,074 A | * | 3/1981 | Meratti et al. | 414/792 |
| 4,336,926 A | * | 6/1982 | Inagaki et al. | 269/34 |
| 4,736,971 A | * | 4/1988 | McManus | 294/87.1 |
| 6,056,496 A | * | 5/2000 | Myers et al. | 414/398 |
| 6,264,422 B1 | * | 7/2001 | Hennes et al. | 414/792.7 |
| 6,533,533 B1 | * | 3/2003 | Heston | 414/791.6 |
| 6,589,008 B1 | * | 7/2003 | Ingraham | 414/791.7 |
| 6,658,816 B1 | * | 12/2003 | Parker et al. | 53/397 |
| 2005/0063815 A1 | * | 3/2005 | Pierson et al. | 414/799 |
| 2008/0050216 A1 | * | 2/2008 | Bolzani | 414/791.6 |
| 2009/0220327 A1 | * | 9/2009 | Scholtes et al. | 414/749.6 |
| 2010/0129188 A1 | | 5/2010 | Perl | |
| 2011/0076126 A1 | * | 3/2011 | Pierson et al. | 414/788.1 |

FOREIGN PATENT DOCUMENTS

| | | | | |
|---|---|---|---|---|
| DE | 102007063286 A1 | | 11/2008 | |
| EP | 0825139 | * | 2/1998 | B65G 57/06 |
| EP | 0999156 A1 | | 5/2000 | |
| FR | 2861714 | * | 5/2005 | B65G 57/24 |
| GB | 2397285 | * | 7/2004 | B65G 57/08 |

* cited by examiner

PALLETISING DEVICE

FIELD OF INVENTION

This invention concerns a palletising device, that is, an automatic device for stacking wrapped products, for example bottle packs, on pallets.

BACKGROUND

A known palletising device comprises two operating platforms, one of which is superposed over the other, the upper platform being situated along a conveyor line of the products to be palletised, while the lower platform is situated along a line conveying pallets.

The lower platform is associated to an elevator group which vertically moves the platform between a lowered position, in which the platform receives an empty pallet from the conveyor line, and a raised position, in which the platform positions the pallet at a short distance beneath the upper platform.

The upper platform comprises support means having a variable configuration, typically a shutter, which can be shifted by activating means between a closed configuration, in which the support means provide a loading surface which restingly supports the products to be palletised, and an open configuration, in which the support means remove their support, thus allowing the products to fall downwardly under gravity.

When the support means are in a closed configuration, the products to be palletised are loaded on the loading surface horizontally, such as to form a layer of grouped products, after which the support means are brought into an open configuration, so that the layer of products rests directly on the pallet which is borne by the underlying lower platform.

At this point, the lower platform is lowered by an amount which is substantially the same as the height of the products collected together on the pallet, and the support means of the upper platform are brought back to a closed configuration, in order to be able to receive another layer of products.

This cycle is repeated several times, until a complete stack of products is formed on the pallet.

When the operations are terminated, the lower platform is brought back to the initial lowered position, so that the completely loaded pallet can be removed from the conveyor line and sent towards further operating stations, the completely loaded pallet being replaced by an empty pallet.

A drawback of this device arises from the fact that during the removal of the loaded pallet, and its replacement with a fresh empty pallet, the lower platform has to remain constantly in a lowered position, which makes it impossible to commence a new stacking phase.

The document DE 28 08 129 discloses a device in which an intermediate platform is provided between the upper platform and the lower surface, the intermediate platform being associated to activating means which shift it between two fixed positions, namely a raised position under the upper platform and a lowered position over the lower surface on which the pallet is located, and vice versa. The intermediate platform is not suitable for receiving progressively the layers of products resting one on the other.

As a result, these operating phases can only be performed in a strictly sequential way, which means that a somewhat long overall time is necessary in order to terminate the palletising operation.

SUMMARY

The aim of this invention is to obviate the above-mentioned drawback, by making available a palletising device which is of the type delineated above, but which operates in an overall more rapid way, thus increasing its productivity.

A further aim of the invention is to achieve the above-mentioned aim within the ambit of a simple, rational and relatively economical solution.

These aims are achieved by the characteristics of the invention described herein below in independent claim 1. The dependent claims delineate preferred and/or particularly advantageous aspects of the invention.

In detail, the invention provides a palletising device comprising a lower surface which restingly receives a pallet, an upper platform provided with first variably-configurable support means, and relative activating means, which move the support means cyclically between a closed configuration, in which the support means define a support for a layer of products to be palletised, and an open configuration, in which the support means remove their support, thus releasing the layer of products downwardly.

In the invention, an intermediate platform is interposed between the lower surface and the upper platform, the intermediate platform being associated to activating means which shift it between a raised position and a lowered position, and vice versa.

The intermediate platform comprises second variably-configurable support means, and activating means which maintain the second support means in a closed configuration while the intermediate platform is shifting between the raised position and the lowered position, in which closed configuration the second support means define a support which progressively receives the layers of products released by the upper platform, thus forming a stack, the activating means shifting the support means to an open configuration when the intermediate platform reaches the lowered position, in which open configuration the support means remove their support, thus releasing the entire stack of products towards the underlying lower surface, and resting the stack of products on the pallet.

In the palletising operation, thanks to this device, an empty pallet is initially loaded on the lower support surface, while the intermediate platform is arranged in the raised position.

The products to be palletised are loaded on the upper platform horizontally, in such a way as to form a layer of grouped-together products on the first support means, which first support means are initially in a closed configuration.

At this point, the first support means are opened, so that under gravity the layer of products rests on the second support means, which are in a closed configuration on the intermediate platform.

The intermediate platform is then lowered by an amount which is substantially the same as the height of the collected products, after which the first support means of the upper platform are returned into the closed configuration in order to be able to receive another layer of products, and the cycle is repeated.

In practice, the intermediate platform is shifted downwardly in discrete steps. Between each step and a subsequent step, the first support means of the upper platform are initially closed in order to receive a layer of products, and subsequently opened in order to release the layer of products on the second support means of the intermediate platform.

In this way, as the intermediate platform gradually descends, the second support means collect a stack of products.

When the stack is complete, the intermediate platform is arranged in a lowered position, and the second support means are opened so that the stack rests on the underlying pallet.

At this point, with the second support means maintained in an open configuration, the intermediate platform can be raised towards the initial position, so as to start a new stacking phase, while the previously-loaded pallet is removed from the lower support surface and replaced with an empty pallet.

In this way it is effectively possible to save time and consequently to obtain greater productivity.

BRIEF DESCRIPTION OF THE DRAWINGS

Further characteristics and advantages of the invention will emerge, with the aid of the appended figures of the drawings, from the following detailed description which is provided by way of a non-limiting example.

DETAILED DESCRIPTION OF THE PREFERRED EMBODIMENTS

Proceeding from the top downwards, the palletising device 1 comprises an upper platform 2.

Figure 5:
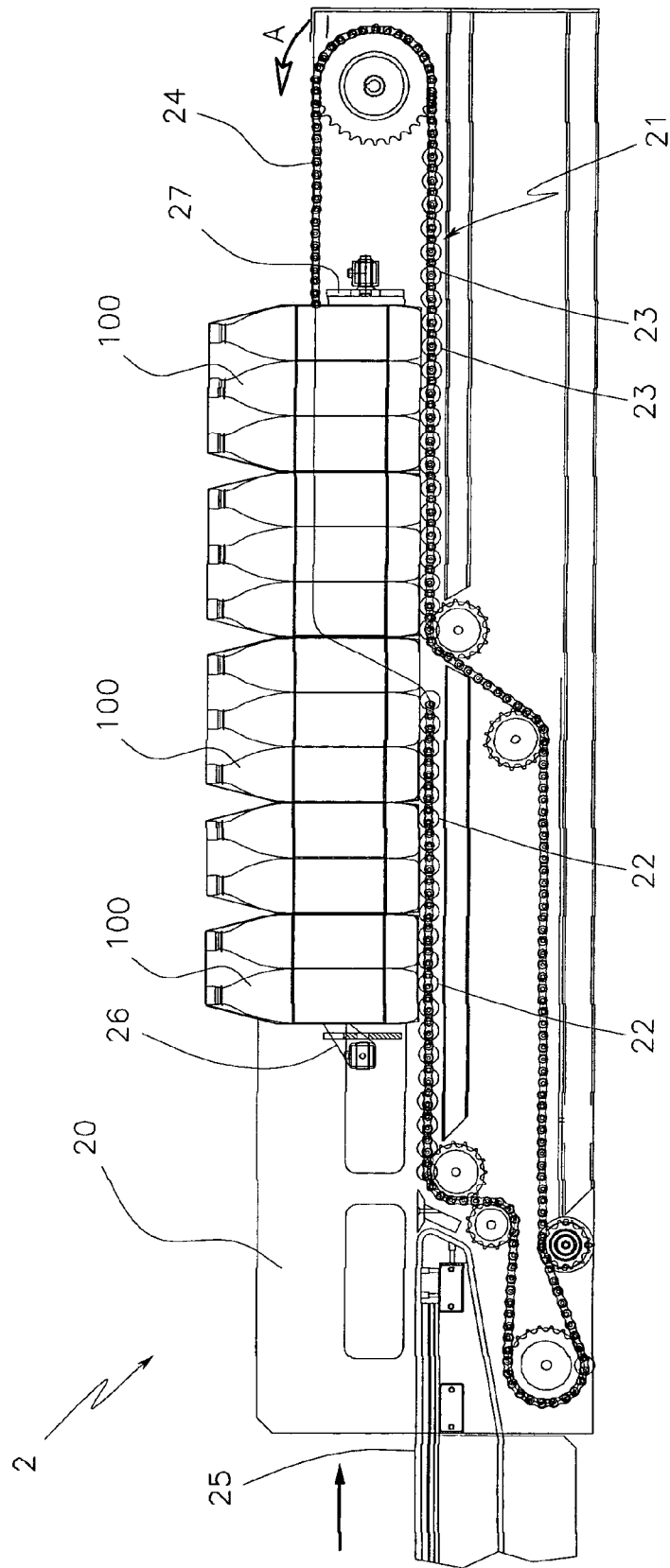
FIG. 5 is an enlarged detail of FIG. 2.

As shown in FIG. 5, the upper platform 2 comprises a pair of oppositely-positioned vertical sides 20 (only one of which is visible), between which a shutter 21 is interposed.

The shutter 21 can take on a closed configuration (shown in the figure), in which it makes a horizontal loading surface available which restingly supports the bottle packs 100, and an open configuration (not shown), in which it leaves an open passage so as to allow the bottle packs 100 to descend under gravity.

More in detail, the shutter 21 comprises two groups of horizontal support rollers, indicated by reference numerals 22 and 23 respectively, the opposite ends of which are associated to the links in two identical guide and support chains 24 (only one of which is visible), which are specular and oppositely positioned, and are respectively associated to the two vertical sides 20.

Each guide and support chain 24 lies in a vertical plane and is ring-wound around a set of respective cogged pinions.

All the cogged pinions are connected together kinematically, in such a way that the motion of the two guide and support chains 24 is always synchronised and at the same speed.

Along their extension, the guide and support chains 24 exhibit an upper outward advancement branch and a lower return advancement branch which move in opposite directions.

Both the outgoing and the return branch follow a curvilinear trajectory which exhibits a horizontal central tract, such that the horizontal tract of the outgoing branch is in the same plane as, and is adjacent to, the horizontal tract of the return branch.

The support rollers 22, which are reciprocally parallel and close to each other, are attached along the horizontal tract of the forward branch, while the support rollers 23 are attached, reciprocally parallel and close to each other, along the horizontal tract of the return branch.

In this way, the two groups of support rollers 22 and 23 take on a closed configuration, in which they are coplanar and close together, and in which they therefore define a single loading surface which supports the bottle packs 100.

Starting from this closed configuration, the guide and support chains 24 can be made to travel in the direction indicated by the arrow A, in such a way that the groups of support rollers 22 and 23 move further from each other in opposite directions until they reach an open configuration in which they leave an open passage beneath the bottle packs 100.

The guide and support chains 24 can then be made to travel from the open configuration in the opposite direction, thus bringing the groups of support rollers 22 and 23 back to the initial closed configuration.

The guide and support chains 24 are driven by a single motor (of known type and therefore not shown) which sets in rotation at least one of the cogged pinions on which the chains are wound.

The upper platform 2 is associated to an independently-driven conveyor belt 25, which is coplanar with and close to the loading surface which is defined by the closed shutter 21.

The conveyor belt 25 conveys the bottle packs 100 towards the upper platform 2, for example from a wrapping machine, locating them on-board the loading surface in groups.

In order for each group of bottle packs 100 to be positioned in the centre of the loading surface, the upper platform 2 is further provided with a pusher organ 26, which moves with a kind of stepped motion in which it shifts horizontally and rises and falls in a parallel direction to the direction of advancement of the conveyor 25.

During its forward travel, the pusher organ 26 is lowered to push an entire group of bottle packs 100 slidingly on the support rollers 22 and 23 until they stop against an end stop element 27.

During its return travel, the pusher organ 26 is raised, thus enabling the bottle packs 100 coming from the conveyor belt 25 to pass beneath it.

The pusher organ 26 is driven by motor means of a known type which are not shown.

The palletising device 1 further comprises an intermediate platform 3, which is coupled with at least one guide column 4 and is associated to elevator means (of known type and therefore not shown) which vertically move the intermediate platform 3 from a raised position towards a lowered position and vice versa.

Figure 6:
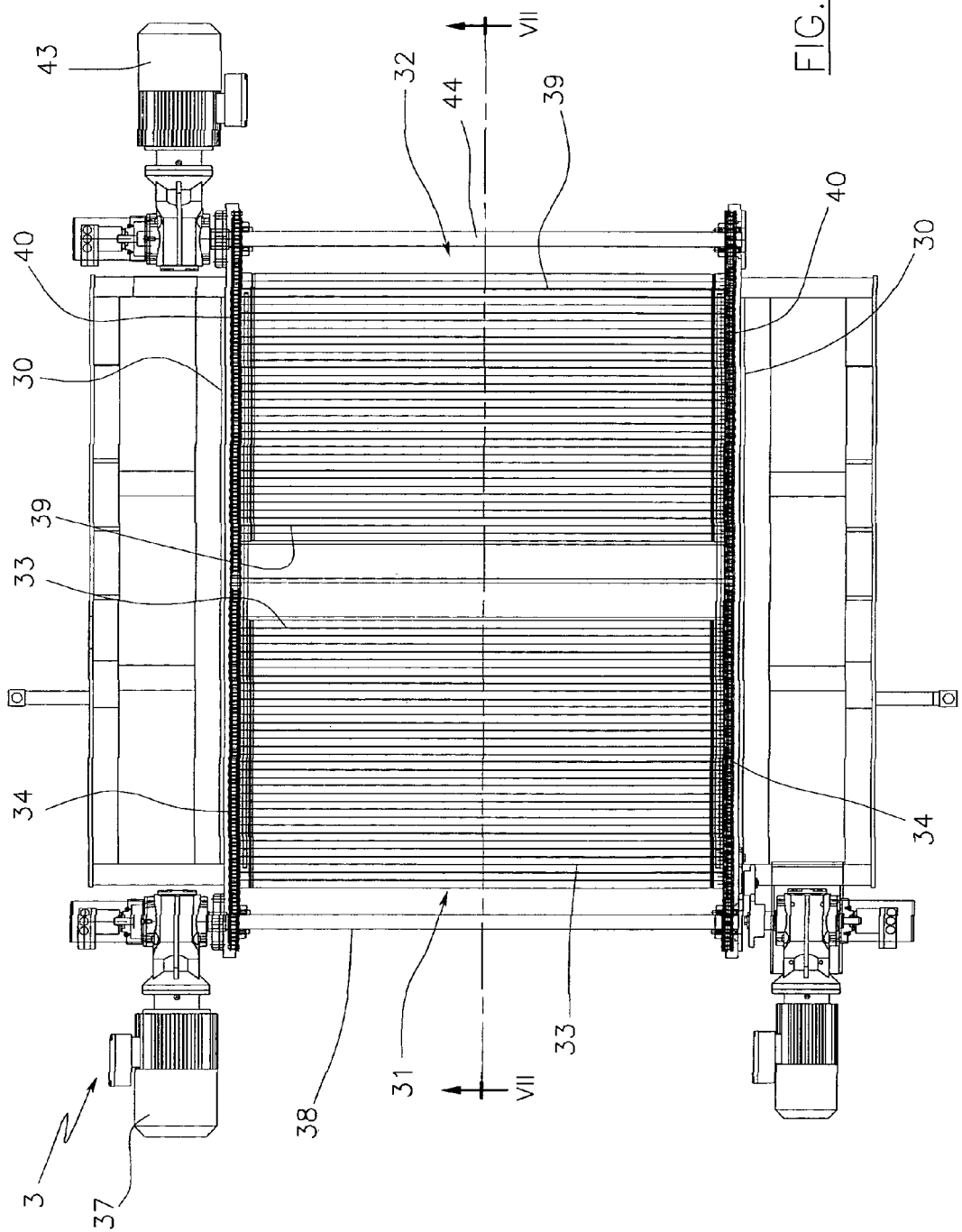
FIG. 6 is a plan view of the intermediate platform of the palletising device, in which the centring means have been hidden to highlight the support shutters.

As shown in FIG. 6, the intermediate platform 3 comprises two vertical, oppositely-positioned sides 30 between which an empty space is defined which is occupied by a first shutter 31 and a second shutter 32.

The shutters 31 and 32 can take on an overall closed configuration (shown in the figure), in which they define a single horizontal loading surface which fills the empty space between the vertical sides 30 in order to support the bottle packs 100 which thus rest on them, and an open configuration (not shown), in which they leave an open passage, thus allowing the bottle packs 100 to descend under gravity.

In more detail, the first shutter 31 comprises a group of support rollers 33, which are horizontal and close together, opposite ends of which are associated to the links of two support chains 34, which support chains 34 are identical, specular and oppositely positioned to each other and are respectively associated to the two vertical sides 30.

Figure 7:
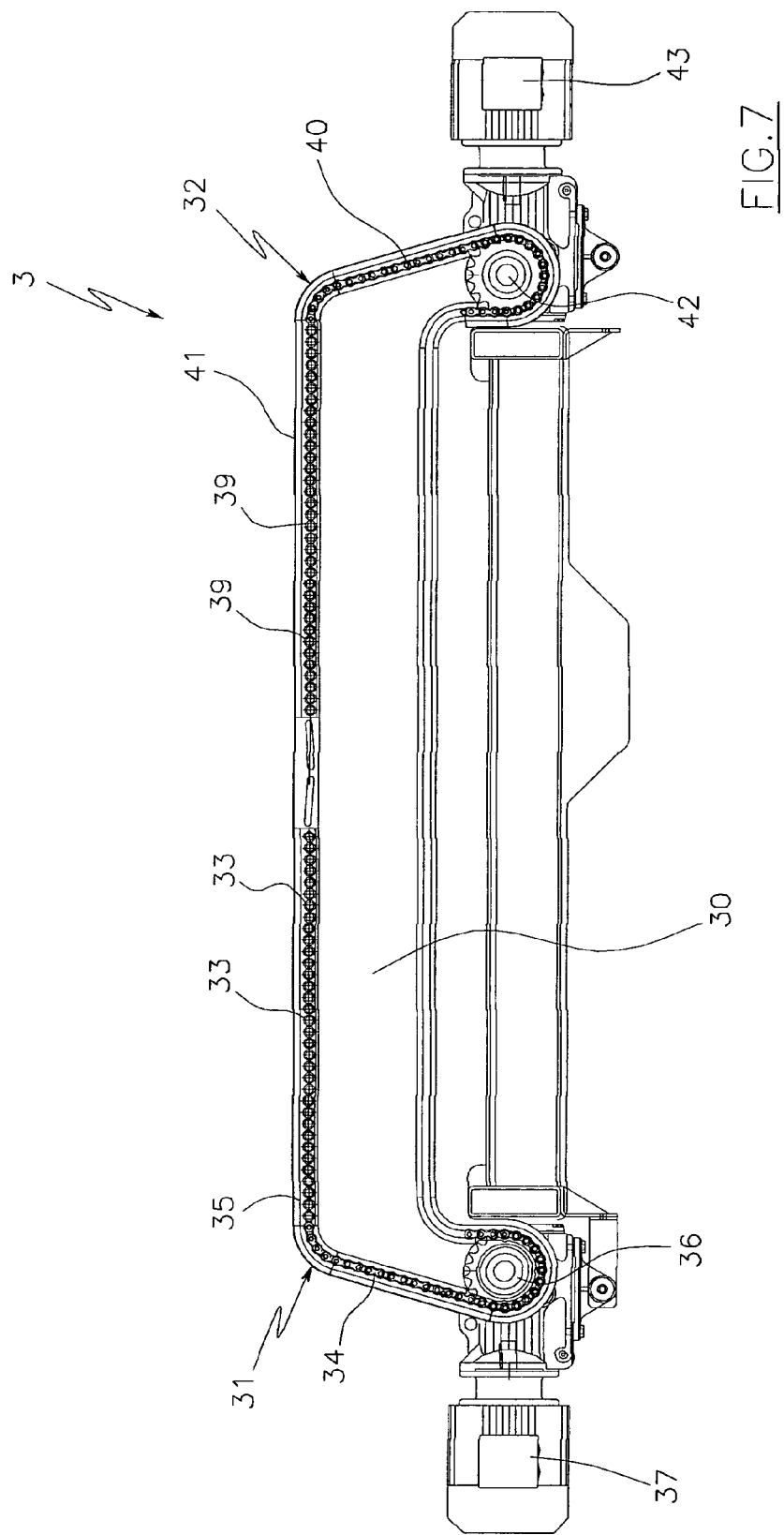
FIG. 7 is a view along section VII-VII of FIG. 6.

As shown in FIG. 7, the support chains 34 are open-ended, and are singly coupled to a guide rail 35 which constrains them to wind around a cogged pinion 36 and to travel in a vertical plane along a trajectory which includes a horizontal upper tract.

The support chains 34 are moved by a single motor 37 which sets the two cogged pinions 36 in rotation, which are kinematically connected to a drive shaft 38 (see FIG. 6), such that the motion of the two support chains 34 is always synchronised and at the same speed.

The support rollers 33 are attached, parallel and close to each other, along the end portions of the support chains 34, such as to be coplanar at the upper horizontal tract of the guide rail 35.

The second shutter 32 is structurally alike to the first shutter 31, to which it is substantially specular.

In more detail, the second shutter comprises a group of support rollers 39, which are horizontal and parallel, opposite ends of which are associated to links of two support chains 40 which are identical, specular and oppositely positioned to each other, and respectively associated to the two vertical sides 30 of the intermediate platform 3.

Each support chain 40 is coupled to a guide rail 41 which makes the chain wind around a cogged pinion 42 and travel in a vertical plane along a trajectory comprising a horizontal upper tract.

The support chains 40 are activated by a single motor 43 which sets the two cogged pinions 42 in rotation, which are kinematically connected to a drive shaft 44, such that the motion of the two support chains 40 is always synchronised and at the same speed.

The support rollers 39 are attached, parallel and close to each other, along the end portions of the support chains 40, in such a way that the support rollers 39 are coplanar at the upper horizontal tract of the guide rails 41.

As clearly shown in FIG. 7, the horizontal tract of the guide rails 41 is aligned with the horizontal tract of the guide rails 35 of the first shutter 31, so that the two groups of support rollers 33 and 39 can be shifted closer together in order to reach a closed configuration in which they define a single loading surface which supports the bottle packs 100.

Starting from this closed configuration, and by means of simultaneous travel of the support chains 34 and 40 in opposite directions, the groups of support rollers 33 and 39 can be shifted away from each other until an open configuration is achieved in which the support rollers 33 and 39 leave an open passage centrally beneath the bottle packs 100, and subsequently, the support 33 and 39 rollers can be brought back to a closed configuration via inverse travel.

The intermediate platform 3 further comprises means for centring the bottle packs 100 on the loading surface defined by the shutters 31 and 32 in a closed configuration.

Figure 8:
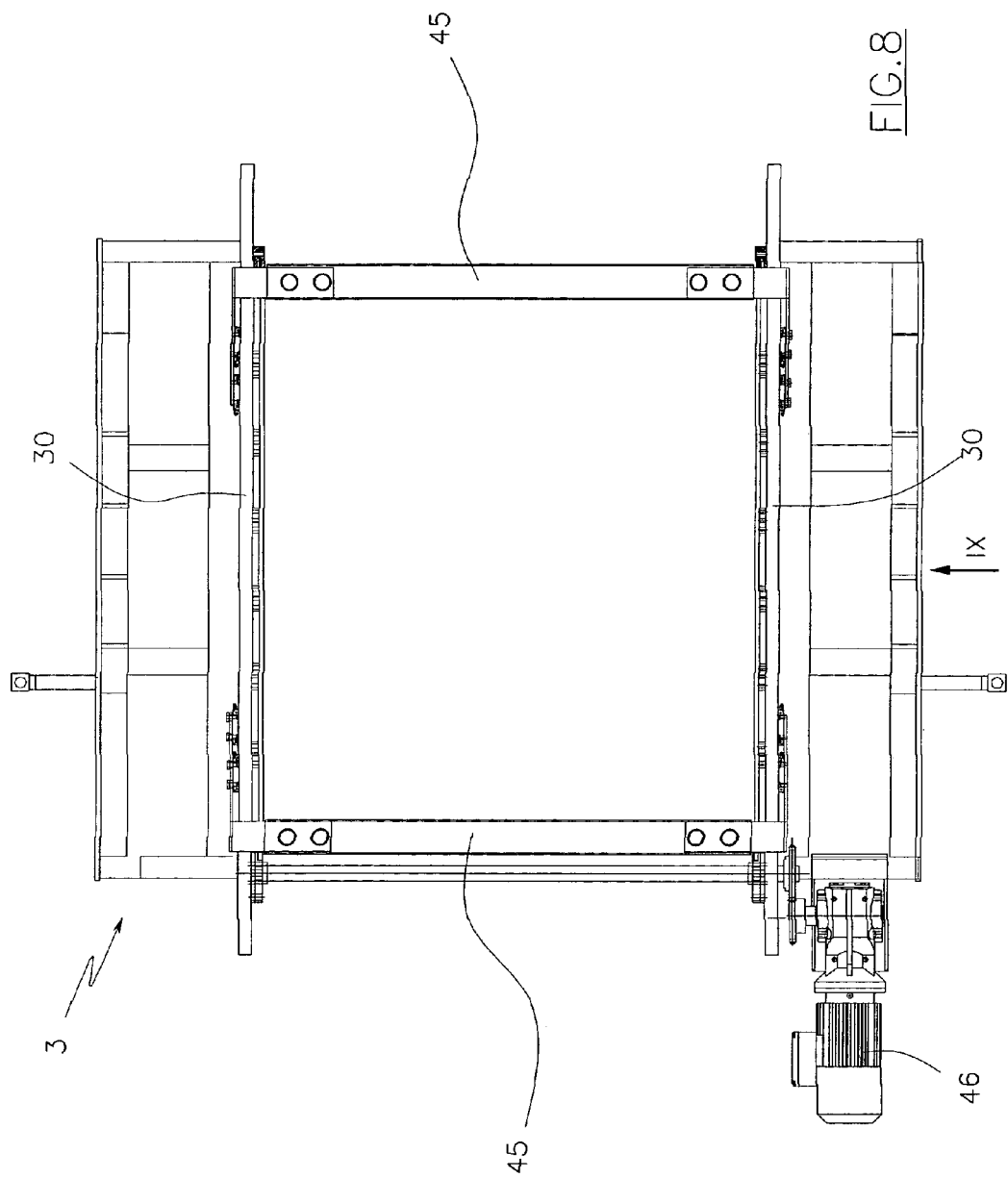
FIG. 8 is a plan view of the intermediate platform of the palletising device, in which the support shutters have been hidden to highlight the centring means.
Figure 9:
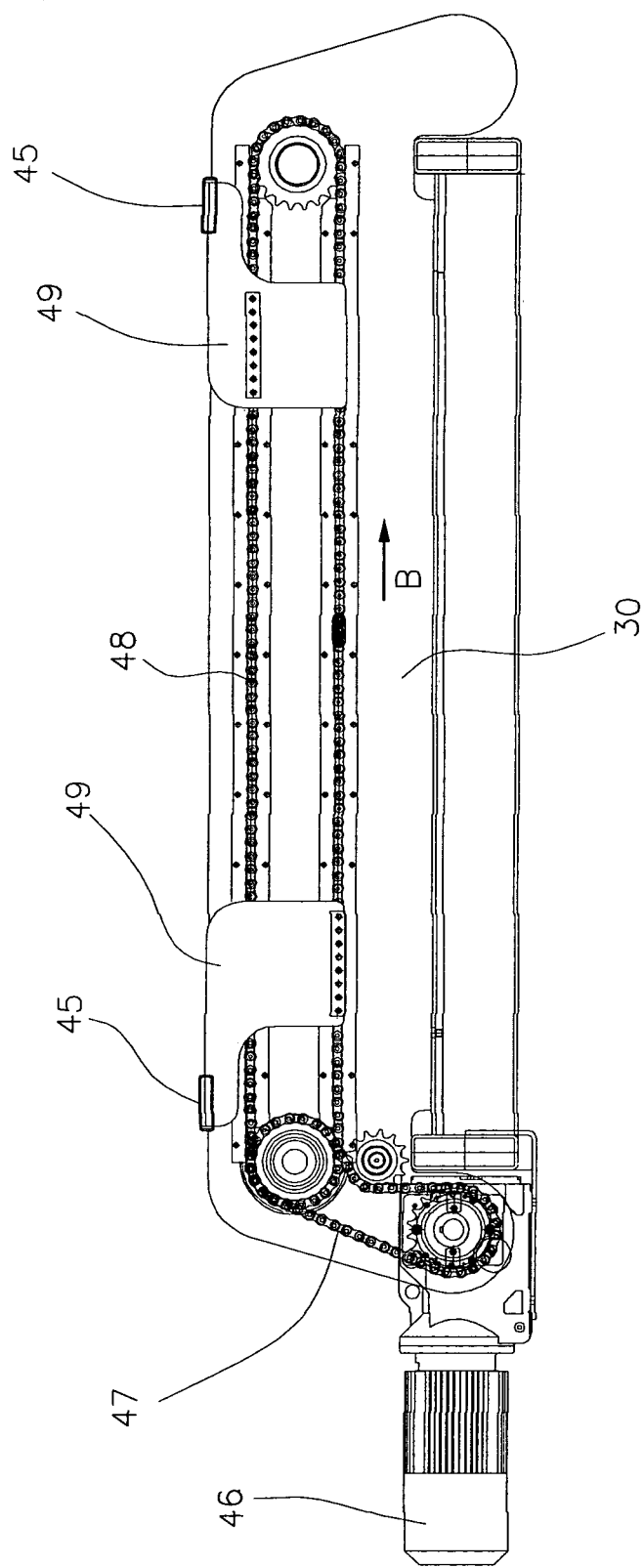
FIG. 9 is the view indicated by reference numeral IX in FIG. 8. The device described herein palletises packs 100 of bottles, although this does not exclude it from being used for palletising other wrapped products.

As shown in FIGS. 8 and 9, the means for centring comprise two parallel and oppositely-positioned flat pusher bars 45, which rest on the upper horizontal edges of the vertical sides 30, therefore at a slightly higher level with respect to the closed shutters 31 and 32.

The pusher bars 45 can move horizontally closer to and further from each other, thus enabling them to tightly grip the bottle packs 100 resting on the shutters 31 and 32.

The horizontal motion is powered by a single drive motor 46 which activates a second chain 48 by means of a first drive chain 47 (see FIG. 9).

The second chain 48 lies in a vertical plane externally to one of the vertical sides 30 of the intermediate platform 3, and is ring-wound on two cogged pinions, in such a way that it exhibits two horizontal branches, an upper outward advancement branch and a lower return advancement branch, which travel in opposite directions.

The pusher bars 45 are connected to the second chain 48 via a respective bracket 49. One bracket 49 is attached to the links of the chain 48 on the outgoing advancement branch, while the other bracket 49 is attached to the links of the chain 48 on the return advancement branch.

In this way, following a movement of the chain 48 in direction B, the pusher bars 45 move closer to each other, while when the chain travels 48 in the opposite direction, the pusher bars 45 move away from each other.

Figure 1:
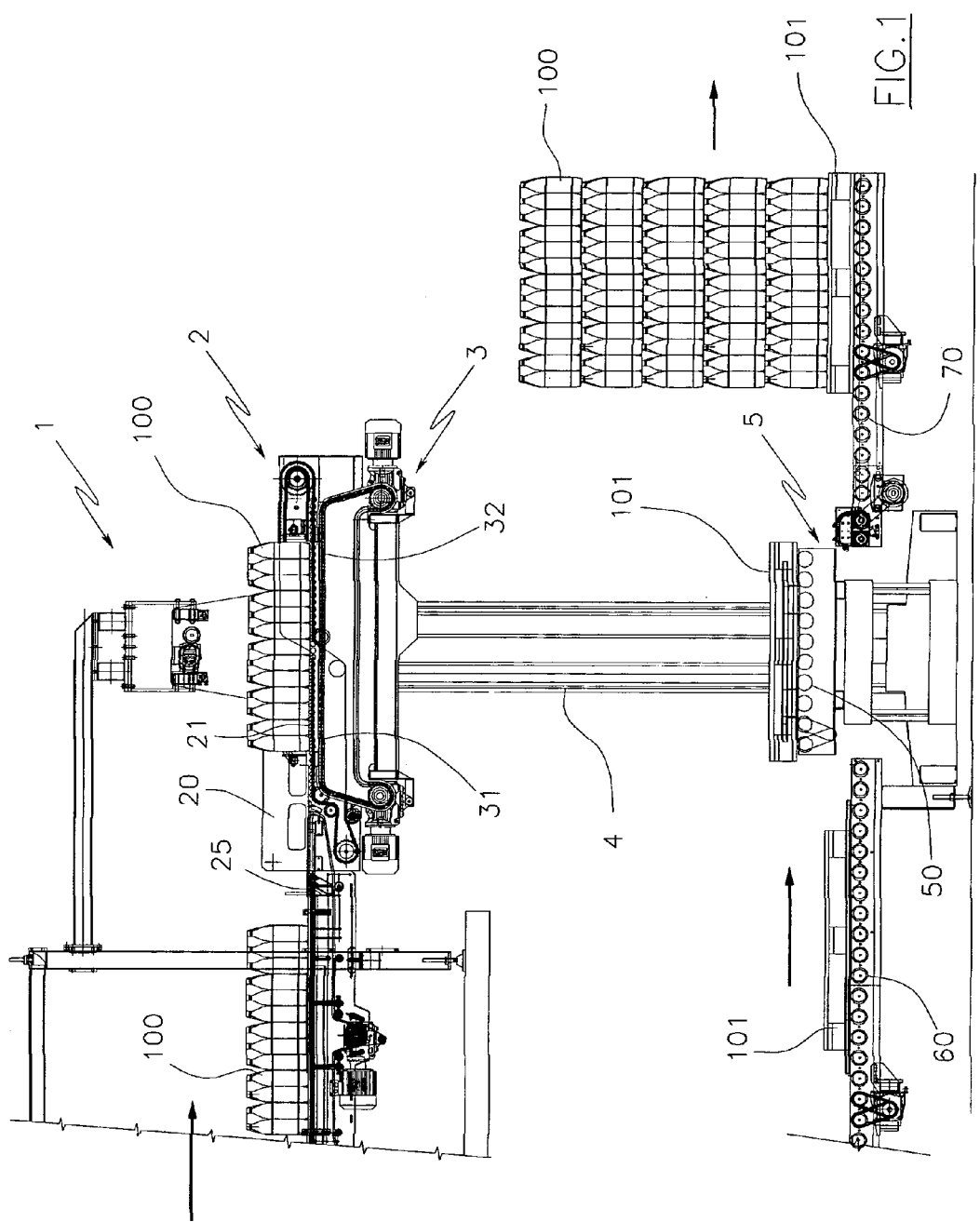
FIGS. 1 to 4 show a palletising device of the invention during four successive operating phases.

As shown in FIG. 1, when the intermediate platform 3 is in a raised position, the loading surface defined by the shutters 31 and 32 is at a short distance beneath the loading surface defined by the shutter 21 of the upper platform 2.

Figure 3:
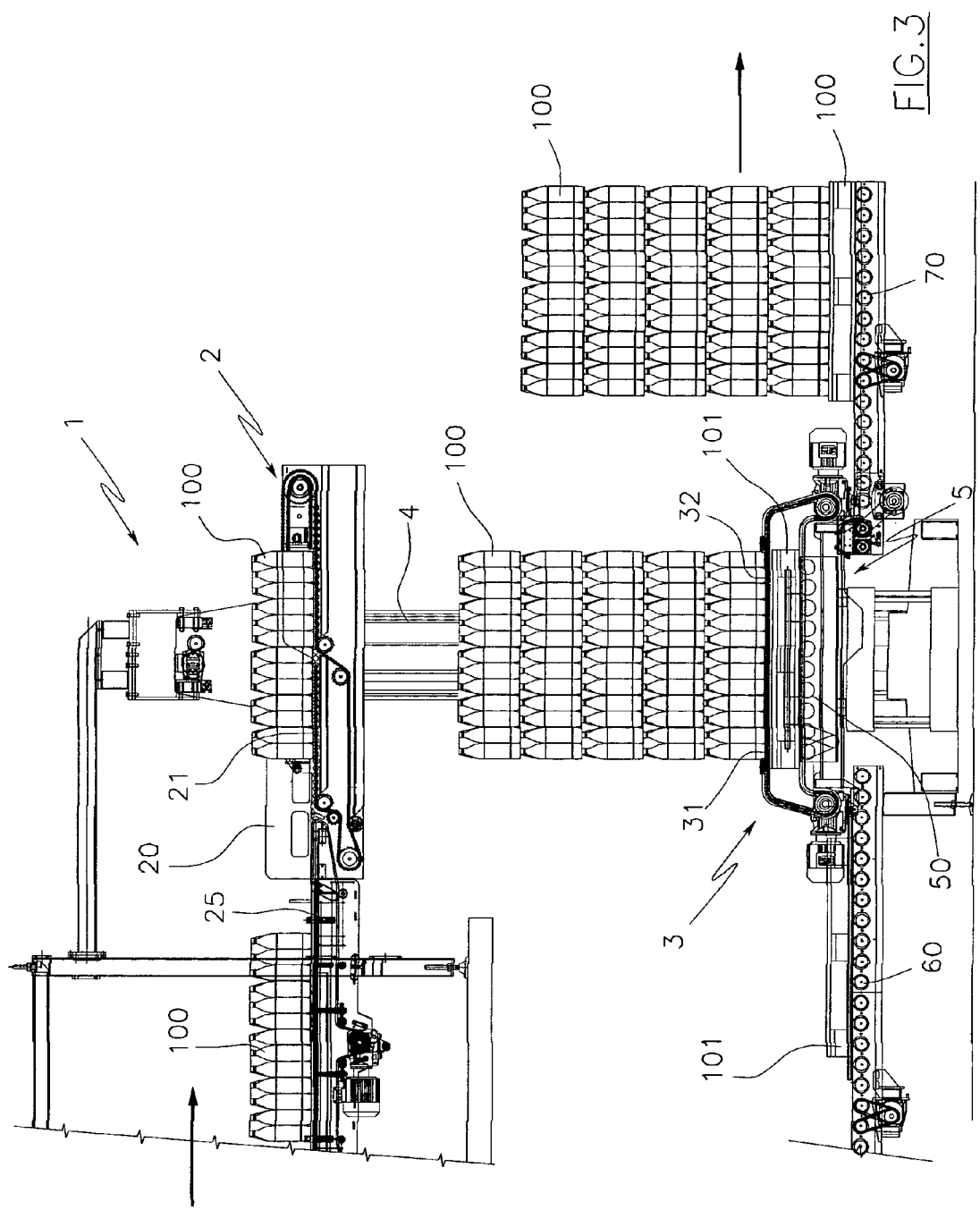

Instead, when the intermediate platform 3 is in a lowered position (see FIG. 3), the distance between the loading surface defined by the shutters 31 and 32 and the loading surface defined by the shutter 21 is greater than the maximum height of an entire stack of bottle packs 100.

The palletising device 1 further comprises a lower platform 5, which is vertically aligned with the previously-mentioned platforms and is arranged beneath the intermediate platform 3.

The lower platform 5 comprises a motorised roller plane 50 which defines a loading surface for a pallet 101, and is associated to an elevator group (of known type), which moves it vertically between a lowered position and a raised position.

When the lower platform 5 is a lowered position, the motorised roller plane 50 is coplanar with a motorised loading roller plane 60 and a motorised unloading roller plane 70, together with which the motorised roller plane 50 defines a conveyor line for the pallets 101.

In detail, the loading roller plane 60 advances empty pallets 101 towards the lower platform 5, while the unloading roller plane 70 removes the pallets 101 which are already loaded with bottle packs 100 from the lower platform 5.

Naturally the roller plane 50, like the roller units 60 and 70, can be replaced by other types of motorised conveyors.

The functioning of the palletising device 1 is as follows.

The shutter 21 of the upper platform 2 is initially in a closed configuration, thus defining the loading surface which supports the bottle packs 100.

Contemporaneously, the intermediate platform 3 is in a raised position, with the shutters 31 and 32 in closed configuration in turn defining the loading surface which supports the bottle packs 100.

In the meantime, an empty pallet 101 is loaded onto the motorised roller plane 50 of the lower platform 5, the lower platform 5 then being shifted from the lowered position into the raised position.

At this moment, the conveyor belt 25 advances the bottle packs 100 towards the upper platform 2, in such a way that the pusher organ 26 can form a layer of bottle packs 100 grouped together at the centre of the closed shutter 21 (see FIG. 1).

Subsequently the shutter 21 of the upper platform 2 is opened, in such a way that the layer of bottle packs 100 comes to rest under gravity on the closed shutters 31 and 32 of the intermediate platform 3.

In this phase the pusher bars 45 are also activated so that they tightly grip the just-deposited layer of bottle packs 100, centring the layer of bottle packs and ensuring that it is more stable.

With the shutters 31 and 32 closed, the intermediate platform 3 is subsequently lowered by an amount which is substantially the same as the height of the bottle pack 100, after which it is halted for a certain period of time.

During this time, the shutter 21 of the upper platform 2 is first closed again, so that the conveyor belt 25 and the pusher organ 26 can form a new layer of bottle packs 100 upon it, and is then reopened, such as to release the new layer of bottle packs 100 onto the earlier deposited layer. Subsequently the lower platform 3 is lowered again and the cycle is repeated.

Figure 2:
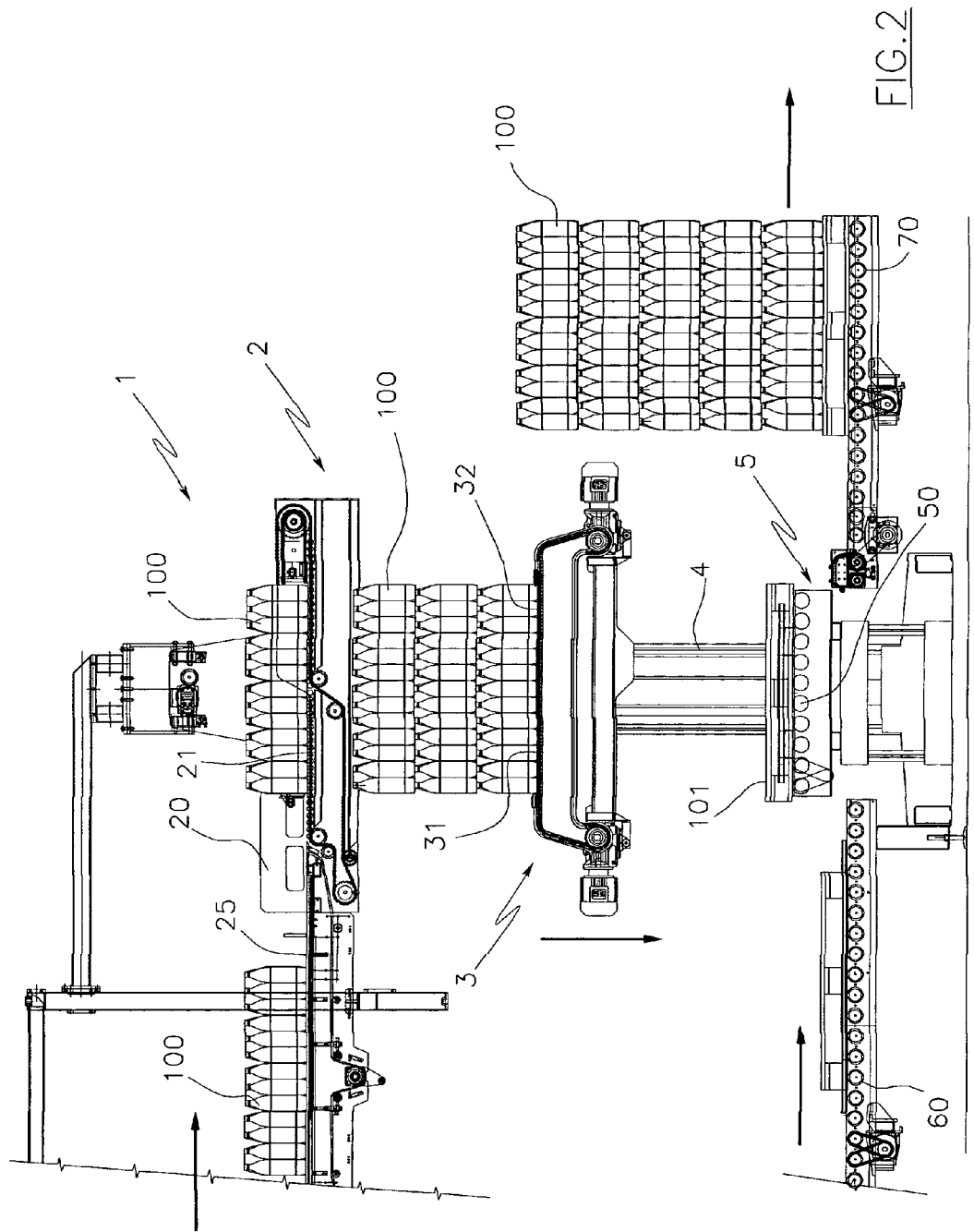

In other words, the shutter 21 of the upper platform 2 closes and opens cyclically, each time releasing a layer of bottle packs 100 on the closed shutters 31 and 32 of the underlying intermediate platform 3, which moves downwardly after each release phase, until it has collected an entire stack of bottle packs 100 (see FIG. 2).

When the stack of bottle packs 100 is complete (see FIG. 3), the intermediate platform is brought into a lowered position, while the lower platform 5 is in a raised position, in such a way that the empty pallet 101 is positioned at a short distance beneath the shutters 31 and 32, which are still closed.

At this point, the shutters 31 and 32 are opened, thus allowing the entire stack of bottle packs 100 to come to rest under gravity on the pallet 101 borne by the lower platform 5.

Note that the movement of the lower platform 5 from the lowered to the raised position is rather small, and has the sole function of arranging the pallet 101 sufficiently near to the shutters 31 and 32 for it to be able to receive the stack of bottle packs 100 in a shock-free way.

Figure 4:
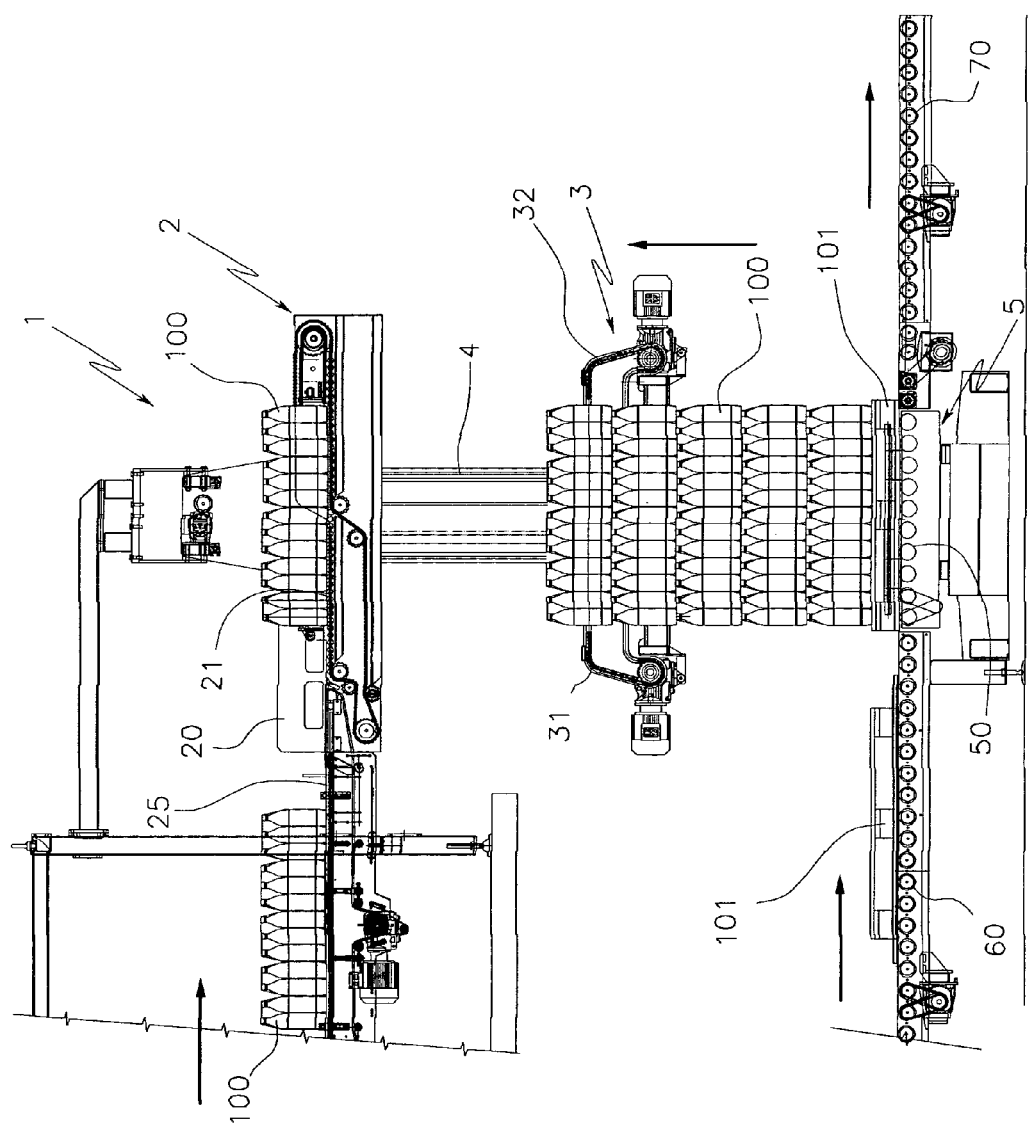

After the release operation, and keeping the shutters 31 and 32 open in order to prevent interference with the stack of bottle packs 100, the intermediate platform 3 is moved towards a raised position in order to repeat the palletising operation (see FIG. 4).

Meanwhile, the lower platform 5 moves to a lowered position, and when the intermediate platform 3 is completely free of the stack of bottle packs 100, the motorised roller units 60, 50 and 70 are set in motion so that the pallet 101 which is loaded with bottle packs 100, is moved away from the lower platform 5, its place being taken by an empty pallet 101.

From the above description, it is clear that the operations of stacking the bottle packs 100 on the intermediate platform 3 and transferring the pallets 101 from and towards the lower platform 5 are carried out in an at least partially contemporaneous way, thus saving time and obtaining greater productivity.

Obviously the palletising system described above can be the object of numerous technical/applicational modifications, without thereby forsaking the ambit of the invention as claimed herein below.

What is claimed is:

1. A palletising device comprising a lower surface (50) arranged on a lower platform that is coupled to an elevator that vertically moves the lower platform between a lowered position and a raised position, wherein a pallet (101) is placed in the lower surface when the platform is in the lowered position and a stack of products is placed on the lower surface when the platform is in the raised position, and an upper platform (2) which is provided with a variably-configurable first support (21), and with a first drive mechanism, which moves the first support (21) cyclically between a closed configuration in which the first support (21) define a support for a layer of products (100) to be palletised, and an open configuration in which the first support (21) remove the support, thus releasing the layer of products (100) downwardly, an intermediate platform (3) is interposed between the lower surface (50) and the upper platform (2), the intermediate platform (3) is coupled to a second drive mechanism, which moves the intermediate platform (3), in a stepwise manner, between a raised position and a lowered position, during the cyclical motion of the first support (21), and vice versa, between each step and a subsequent step there being an adjustable distance, the intermediate platform (3) comprising a variably-configurable second support (31, 32) and third drive mechanism which, during motion of the intermediate platform (3) between a raised position and a lowered position thereof, maintains the second support (31, 32) in a closed configuration in which the second support (31, 32) defines a support which progressively receives the layers of products (100) released from the upper platform (2), thus forming a stack, and when the intermediate platform (3) reaches a lowered position, the third drive mechanism moves the second support (31, 32) into an open configuration, in which the second support (31, 32) removes the support thereof and releases the stack of products (100) towards the underlying lower surface (50), and when the release of the stack of products is completed, the second mechanism moves the intermediate platform towards the raised position contemporaneously with the lower platform being moved to the lowered position.

2. The device of claim 1, wherein the second support comprises two shutters (31, 32) and guides (35, 41) on which the shutters (31, 32) can travel, along a trajectory which includes a horizontal upper tract, in opposite directions from a closed configuration, in which the shutters (31, 32) are coplanar at the upper horizontal tract of the trajectory to define a surface which receives and restingly supports the products (100), towards an open configuration, in which the shutters (31, 32) open a passage for the descent of the products, and vice versa.

3. The device of claim 2, wherein each of the shutters (31, 32) comprises a set of support rollers (33, 39) which are attached between two openly extending support chains (34, 40), the guides comprise two oppositely-positioned rails (35, 41) to which the support chains (34, 40) are slidingly coupled.

4. The device of claim 2, wherein the shutters (31, 32) are activated by a respective drive motor (37, 43).

5. The device of claim 1, wherein the lower support surface (50) for the pallet (101) is arranged on a lower platform (5), said lower platform (5) is coupled to an elevator that vertically moves the lower platform (5) between a lowered position and a raised position thereof.

6. The device of claim 1, wherein the lower support surface for the pallet (101) is provided by a motorised conveyor (50).

7. The device of claim 1, further comprising a conveyor (50, 60, 70) for distancing the pallet (101) from the lower support surface, after release of the stack of products (100), and for replacing it with an empty pallet (101).

8. The device of claim 7, wherein the conveyor (50,60,70) is activated after the drive mechanism has moved the intermediate platform (3) from the lowered position towards the raised position.

9. A method for operating a device according to claim 1, comprising the steps of:
  resting a pallet on the lower surface (50),
  cyclically moving the first support (21) of the upper platform (2) between the open configuration and the closed configuration, thus cyclically releasing a layer of products (100) downwardly,
  moving the intermediate platform (3) between the raised position and the lowered position during the cyclical motion of the first support (21),
  maintaining the second support (31, 32) in the closed configuration during the motion of the intermediate platform (3) between the raised position and the lower position, so that the second support define a support which progressively receives the layers of product (100) released by the upper platform, thus forming a stack, and when the intermediate platform (3) reaches the lowered position, moving the second support (31, 32) into the open configuration, so that the second support (31, 32) remove the support thereof and release the stack of product (100) on the pallet resting on the underlying lower surface (50).

10. The method according to claim 9, wherein the intermediate platform (3) is shifted downwardly in discrete steps, and wherein, between each step and a subsequent step, the first support (21) of the upper platform (2) are initially closed in order to receive a layer of products (100), and subsequently opened in order to release the layer of products (100) on the second support (31, 32) of the intermediate platform (3).

11. The method according to claim 9, wherein the intermediate platform (3) is brought into the lowered position, while the lower platform (5) is in a raised position.

12. The method according to claim 9, wherein, after the release operation, the intermediate platform (3) is moved towards the raised position keeping the second support (31, 32) open.

13. The device of claim 1, wherein the first support (21) comprises two groups of horizontal support rollers (22, 23), the opposite ends of which are associated to two specular and oppositely positioned chains (24), each of which lies in a vertical plane and is ring-wound around a set of respective cogged pinions to follow a curvilinear trajectory which exhibits two coplanar and adjacent horizontal central tracts, along which the guide and support chain (24) can travel in opposite directions from the closed configuration, in which the two groups of support rollers (22, 23) are coplanar at the central horizontal tracts to define a surface that receives and restingly supports the products (100), towards the open configuration, in which the two groups of support rollers (22, 23) are spaced apart from each other to open a passage for the descent of the products, and vice versa.

14. The device of claim 1, wherein the intermediate platform (3) comprises two parallel sides (45), which are mounted on board of the intermediate platform (3) and are coupled to a fourth drive mechanism (46-48), which moves both the sides (45) horizontally closer to or further from each other, such as either to grip in a vice like way or to release the products (100) resting on the second support (31, 32) in the closed configuration thereof.

15. The device of claim 14, wherein the fourth drive mechanism comprises a chain (48) which is ring-wound on respective cogged pinions, such as to exhibit two horizontal branches which travel in opposite directions, a first side (45) of the platform (3) being attached to one of the branches while a second side (45) thereof is attached to the other branch.

16. A method for operating a palletising device, wherein the palletising device comprises:
a lower surface (50) arranged on a lower platform (5), said lower platform (5) being coupled to an elevator that vertically moves the lower platform (5) between a lowered position and a raised position thereof,
an upper platform (2) which is provided with a variably-configurable first support (21), and with a first drive mechanism, which moves the first support (21) cyclically between a closed configuration in which the first support (21) define a support for a layer of products (100) to be palletised, and an open configuration in which the first support (21) remove the support,
an intermediate platform (3) is interposed between the lower surface (50) and the upper platform (2), the intermediate platform (3) is coupled to a second drive mechanism, which moves intermediate platform (3) between a raised position and a lowered position and vice versa, the intermediate platform (3) comprising a variably-configurable second support (31, 32) and a third drive mechanism which moves the second support (31, 32) between a closed configuration in which the second support (31, 32) defines a support for the layers of products (100) released from the upper platform (2), and an open configuration, in which the second support (31, 32) removes the support
and wherein the operating method comprises the steps of:
resting a pallet on the lower surface (50), while the lower platform (5) is in the lowered position thereof,
moving the lower platform (5) with the pallet from the lowered position to the raised position thereof,
cyclically moving the first support (21) of the upper platform (2) between the open configuration and the closed configuration, thus cyclically releasing a layer of products (100) downwardly,
moving, in a stepwise manner, the intermediate platform (3) between the raised position and the lowered position thereof during the cyclical motion of the first support (21),
maintaining the second support (31, 32) in the closed configuration during the motion of the intermediate platform (3) between the raised position and the lower position, so that the second support define the support which progressively receives the layers of product (100) released by the upper platform, thus forming a stack, and when the intermediate platform (3) reaches the lowered position thereof,
moving the second support (31, 32) into the open configuration, so that the second support (31, 32) removes the support thereof and release the stack of product (100) on the pallet resting on the underlying lower surface (50), while the lower platform (5) is in the raised position thereof, and after the release operation,
moving the intermediate platform (3) towards the raised position keeping the second support (31, 32) open and contemporaneously moving the lower platform (5) towards the lowered position.

* * * * *